United States Patent [19]

Stearns

[11] Patent Number: 5,275,735
[45] Date of Patent: Jan. 4, 1994

[54] METHOD AND APPARATUS FOR DISSOLVING GAS IN LIQUID, E.G., IN WASTEWATER COLLECTION AND TRANSMISSION SYSTEMS

[75] Inventor: Donald M. Stearns, Cocoa, Fla.

[73] Assignee: PEC Research, Inc., Titusville, Fla.

[21] Appl. No.: 883,282

[22] Filed: May 14, 1992

Related U.S. Application Data

[63] Continuation-in-part of Ser. No. 330,462, Mar. 30, 1990, abandoned, which is a continuation of Ser. No. 109,192, Oct. 16, 1987, abandoned, which is a continuation-in-part of Ser. No. 799,104, Nov. 18, 1985, abandoned, and a continuation-in-part of Ser. No. 700,610, May 15, 1991, and a continuation-in-part of Ser. No. 588,268, Sep. 26, 1990, Pat. No. 5,133,882.

[51] Int. Cl.$^5$ ............................................. B01D 3/02
[52] U.S. Cl. .................................. 210/628; 210/221.2; 210/258
[58] Field of Search .................. 210/195.1, 195.4, 620, 210/628, 626, 758, 198.1, 220, 221.2, 153, 170, 167, 258

[56] References Cited

U.S. PATENT DOCUMENTS

3,799,346  3/1974  Freeze .............................. 210/195.1
4,093,549  6/1978  Wilson .............................. 210/195.4

Primary Examiner—Frank Sever
Attorney, Agent, or Firm—Antonelli, Terry, Stout & Kraus

[57] ABSTRACT

A method and the apparatus for the dissolving gas in liquid, in particular, dissolving oxygen and elimination of variable flow rates in wastewater collection and transmission systems that provides the means to stop the generation of toxic chemicals, allows existing pipeline capacities to be doubled, provides twice the capacity from existing wastewater treatment plants and improves the quality of the discharge of the wastewater treatment plant.

11 Claims, 10 Drawing Sheets

METHOD AND APPARATUS FOR DISSOLVING GAS IN LIQUID, E.G., IN WASTEWATER COLLECTION AND TRANSMISSION SYSTEMS

This application is a continuation-in-part of application Ser. No. 07/330,462, filed Mar. 30, 1990, now abandoned which is a continuation of application Ser. No. 109,192, filed Oct. 16, 1987, now abandoned which is a continuation-in-part of application Ser. No. 799,104, filed Nov. 18, 1985, now abandoned. This application is also a continuation-in-part of application Ser. No. 07/700,610, filed May 15, 1991, now pending and a continuation-in-part of application Ser. No. 07/588,268, filed Sep. 26, 1990 now U.S. Pat. No. 5,133,882. The contents of each of the aforementioned applications is hereby incorporated by reference.

TECHNICAL FIELD

The invention relates to the treatment of wastewater and, in particular, to controlling dissolved oxygen in wastewater collection and transmission systems.

BACKGROUND ART

The methods used for the gravity collection and presurized transmission of wastewater, from the Point of generation to the point of treatment, has remained unchanged for over 100 years, due to the lack of a solution of a single problem. This problem is the inability to control dissolved oxygen in the gravity collection and pressurized pipelines that compose the wastewater collection and transmission systems used in all existing sanitary disposal facilities.

Due to the very low solubility of oxygen in water, that averages approximately 5 pounds of oxygen in 1,000,000 pounds of water, maintaining a positive value of dissolved oxygen is a major problem due to bacterial action. The cause of the loss of dissolved oxygen in the wastewater is the discharge from animals and human beings that contain active bacteria that consume the small amount of dissolved oxygen in the water. This action, in turn, allows another type of bacteria in the discharged waste to set into action the generation of a number of toxic chemicals, such as methane and hydrogen sulphide. Unless the level of dissolved oxygen is replaced in the gravity collection and pressurized transmission systems of existing and future wastewater systems, humans will be exposed to toxic chemicals generated in the system. Toxic chemicals also cause explosion hazards and corrosion damages to the structures and equipment used in wastewater collection and transmission.

As a result of the lack of the ability to control dissolved oxygen, wastewater collection and transmission must operate on a "what comes in must go out" design basis, which results in a completely impossible condition of operation for the treatment plant thus leading to the destruction of all environmental resources exposed to the discharge from any existing plants. Wastewater treatment must deal with the extremes of flow conditions which may be as low as 10 percent of the average daily flow at night to as much as 250 percent of average daily flow during a 4 to 6 hour peak daytime flow.

Unlike potable water treatment plants, which operate at constant rates and store treated water for peak flow requirements, wastewater treatment plants must deal with the impossible problem of obtaining good result with flows that vary between 10 percent and 250 percent of the average flow received by the plant. Only control of dissolved oxygen can solve the problem of peak flows and treatment results.

DISCLOSURE OF INVENTION

The invention is based on the use of a means and apparatus for controlling the level of dissolved oxygen within the complete gravity collection and pressurized pipeline systems used to transmit the generated wastewater from its source to the point of treatment. This involves not only the ability to increase the solubility of dissolved oxygen, by the known means of application of positive pressure, but the utilization of a large volume of water exposed to the pressure by the apparatus of the invention disclosed herein, a diffuser/mass transfer device. After the water is released from the pressurized zone of the device, the wastewater contains both supersaturated oxygen and entrained oxygen in the form of very small bubbles. This air in the water and the dissolved air contacts the organic material also in the water, both dissolved and solid particles. The elements of the diffuser cause some of the air introduced by the compressor to become entrained in small size air bubbles which can also act to provide surface contact with the organic material that is present in the wastewater in either soluble or insoluble form.

If the height of wastewater in the dissolved oxygen zone is sufficient, the rate of release of supersaturated oxygen from the wastewater is very slow. When released, the oxygen is in the form of smaller than pinhead size micro-bubbles. As the surface area of the micro-bubbles is relatively large, the secondary oxygen transfer is at a maximum.

As the discharge of the diffuser/mass transfer device is confined to dissolved oxygen, microbubbles, and small size entrained bubbles, the rise rate is rapid and the action of the diffuser/mass transfer device does not affect the operation of centrifugal pumps. The directionized discharge of the diffuser/mass transfer device provides complete mixing and solids suspension within the dissolved oxygen control zone.

Aeration apparatus that is now used in existing wastewater treatments plants cannot be applied to pump suction wetwells as the undirectionalized entrained air bubbles would result in failure of the centrifugal pumps, due to air binding.

The subject matter of this invention combines the means of replacing the loss of dissolved oxygen, caused by bacterial action, with the retention necessary for the oxygen transfer to occur, and thus provides not only a method for the control of dissolved oxygen but also eliminates many of the problems found in the treatment plant operation.

The effect of requiring treatment plants to operate at flow rates of 250 percent of average daily flow (peak flow) and 10 percent of average daily flow during night time hours totally limits the effective treatment of wastewater discharge of the discharge of effluent, which is so poorly treated that all forms of the environment are terminally damaged. By using a system that provides a constant flow rate, the quality of treatment can be greatly improved and the plant rated capacity doubled, in most cases, still providing an improvement in the degree of purification. The current design of "what goes in must come out" totally limits performance of all wastewater treatment plants. Also, using the method disclosed in this patent application, the capacity of all existing pipeline systems could be doubled without any increase in power usage and in many cases with a reduction in power.

Another result of using the method disclosed for the control of dissolved oxygen would be almost the complete elimination of the requirement for variable speed pump drives in the operation of all primary pump stations and almost all re-pump stations used for wastewater movement.

BEST MODE FOR CARRYING OUT THE INVENTION

Figure 1:
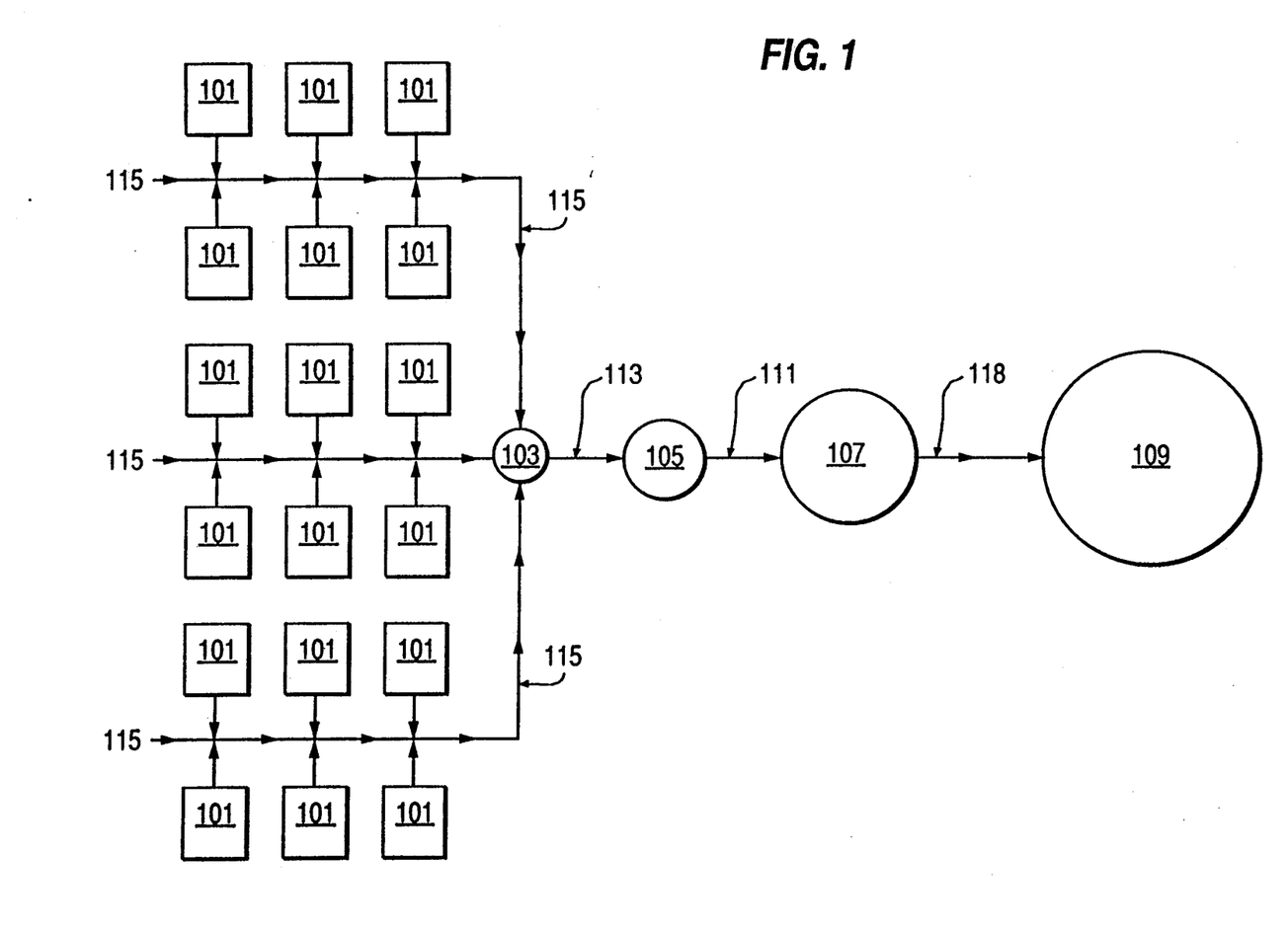
FIG. 1 is a flow diagram.

With reference to FIG. 1, the flow diagram, the system includes (101) sources of wastewater production such as homes and commercial buildings, (115) gravity pipelines, (103) gravity intersecter, (113) combined flow gravity flow pipeline, (105) primary pump station, (111) primary pressurized pipeline, (107) re-pump station, (118) pressurized secondary pipeline and (109) wastewater treatment plant.

Figure 2:
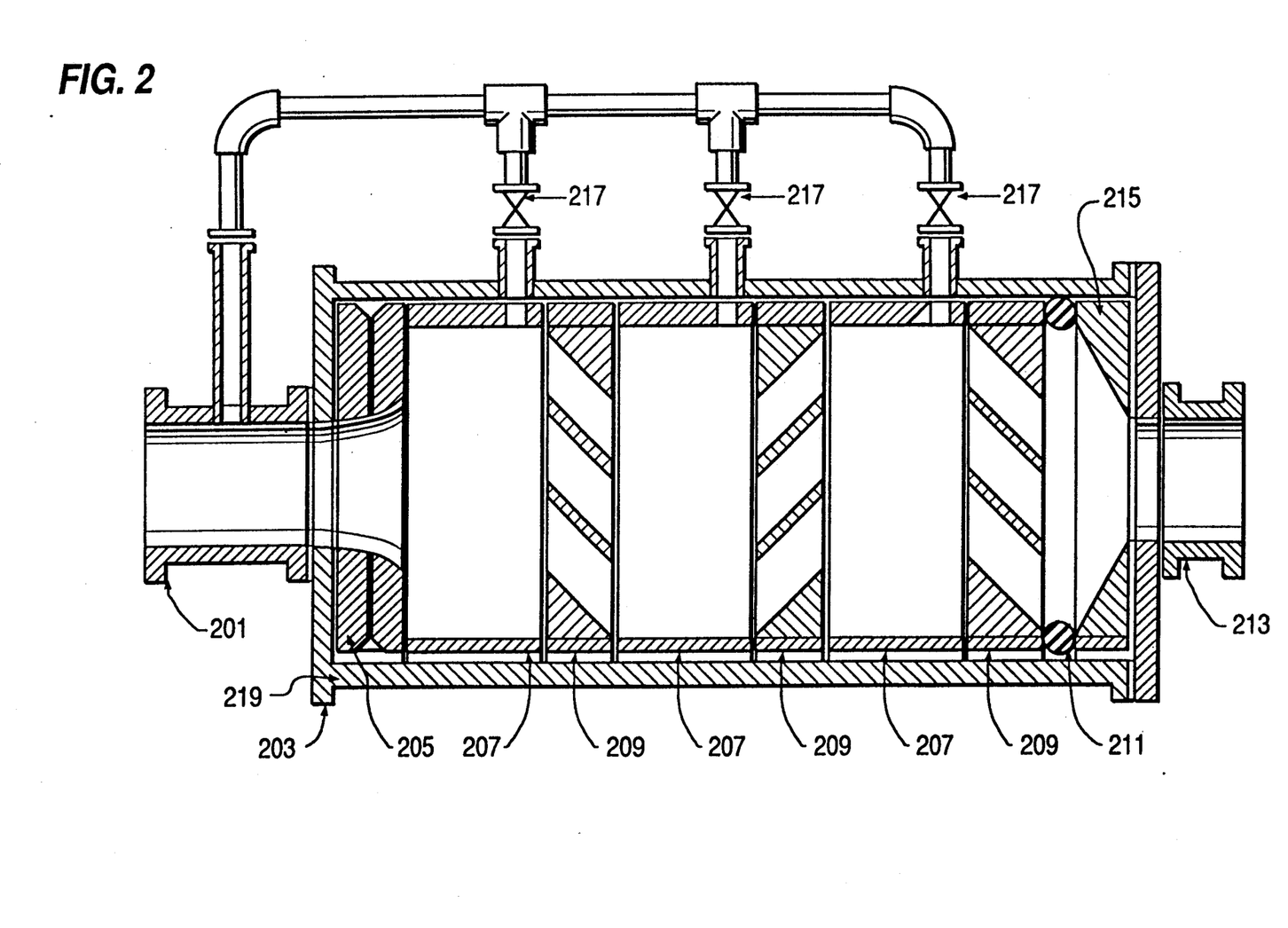
FIG. 2 is a sectional assembly drawing of the diffuser/mass transfer device.

FIG. 2 is a sectional view of the diffuser/mass transfer device which is intended to operate at a minimum pressure of 15, but, more normally, at a pressure of 30 PSIG. The diffuser/mass transfer device provides a range of finely entrained air bubbles but, more importantly, increases the amount of dissolved air which will be released as the pressure is reduced from the bottom to the top of the storage type pump station wetwell.

The diffuser/mass transfer device includes the (201) inlet spool body, the (203) diffuser body, the (205) gas inlet ring, the (207) injection spacer inlet sleeves, the (209) diffuser reversible baffles, the (211) "O" ring, the (213) discharge spool piece, the (215) discharge directional ring, the optional (217) flow control valves (optional for high gas flow rates) and the (219) anti-rotation locking bar.

Figure 3:
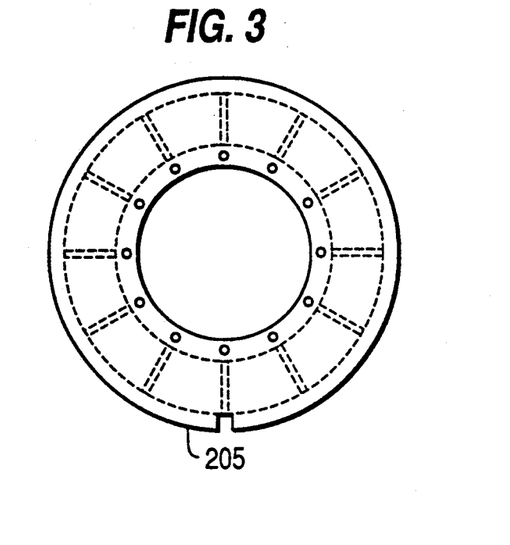
FIG. 3 is a top plan view of the (205) gas inlet ring.

FIG. 3 is a top plan view of the (205) gas inlet ring that shows the method of introduction of the air into the high velocity water flow which provides opposed injection of the air into the water and the 90 degree angle. The opposed flow of the air and the 90 degree angle of injection provides the initial dispersion of the air in the water. The (205) gas inlet ring has a slot for positioning and anti-rotation using the (219) anti-rotation locking bar.

Figure 4:
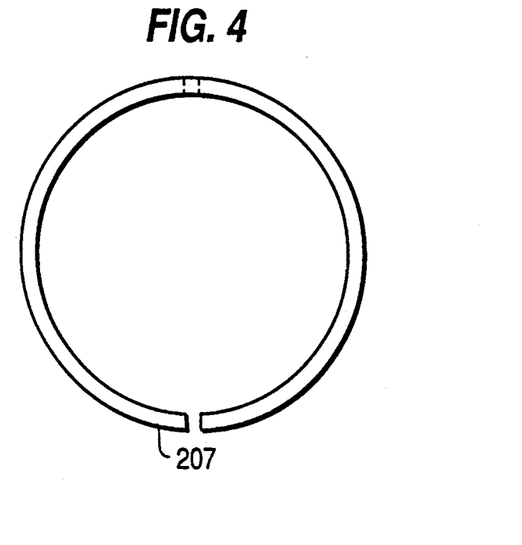
FIG. 4 is a top plan view of the (207) injection spacer inlet sleeve.

FIG. 4 is a top plan view of the (207) inlet spacer used between the (205) gas inlet ring and the (209)diffuser/mass transfer reversible baffle and also between each additional stage (209) reversible baffle.

Figure 5:
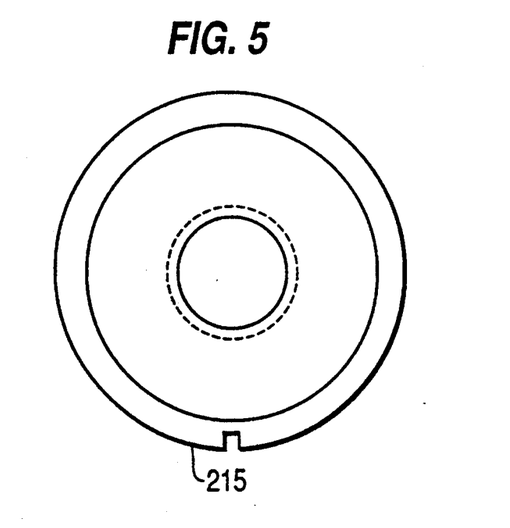
FIG. 5 is a top plan view of the (215) discharge directional ring.

FIG. 5 is a plan top view of the (215) discharge directional ring which rotates the water and dissolved and entrained air to cause a circular motion in addition to the normal linear movement.

Figure 6:
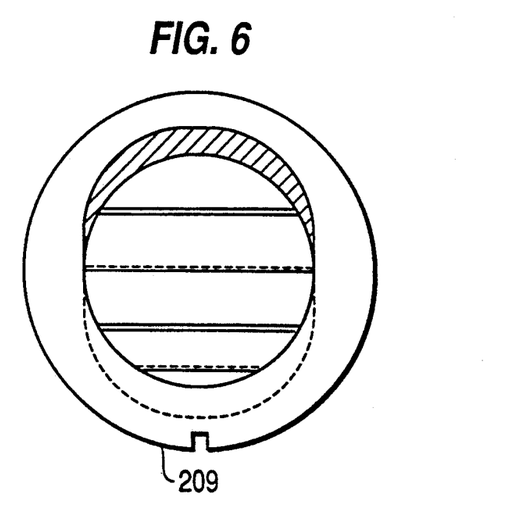
FIG. 6 is a top plan view of the (209) diffuser reversible baffle.

FIG. 6 is a plan top view of the (209) diffuser reversible baffle showing the deflected flow and knife edge which causes turbulence for entrainment of the air in the water flowing at high velocity.

It will be appreciated that this (209) baffle can simply be rotated to face the opposite direction to change the direction of deflection. For Example, as shown in FIG. 2, the second of the series of three (209) baffles faces a direction opposite that of the first and third. This allows the direction of deflection to be changed as the wastewater flows downstream while still requiring a baffle of only one construction.

Figure 7:
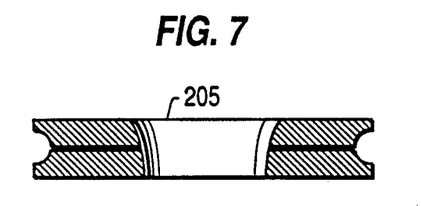
FIG. 7 is a sectional drawing of the (205) gas inlet ring.

FIG. 7 is a sectional drawing of the (205) gas inlet ring providing details of the air flow path around the diameter of the ring and the air flow holes connecting the circular air flow around the diameter of the ring and the high velocity water flow. The venturi shape of the (205) gas inlet ring improves the mixing of the liquid and the gas phase and reduces the velocity of the discharge of the (205) gas inlet ring into the first diffuser stage.

Figure 8:
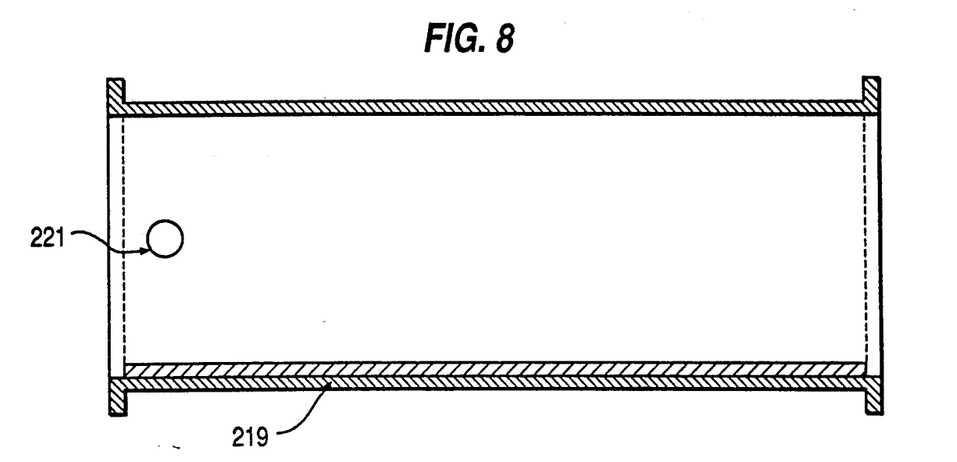
FIG. 8 is a sectional view of the diffuser/mass transfer device body showing the retainer (219) for the reversible diffuser element (209).

FIG. 8 is a sectional view of the (203) diffuser/mass transfer body that contains the pressurized wastewater and air which defines the position of the (219) anti-rotation locking bar which is attached to the (203) diffuser/mass transfer device body. The (219) anti-rotation locking bar allows the (209) diffuser/mass transfer device reversible baffles to impact and deflect the hydraulic flow with a 45 degrees change in direction.

Figure 9:
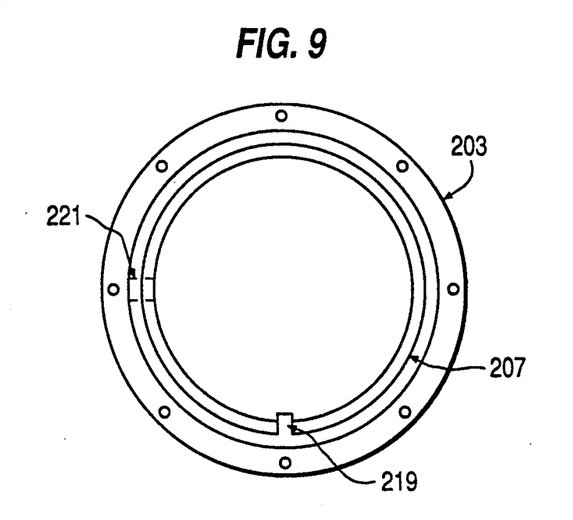
FIG. 9 is an end view of the diffuser/mass transfer device showing the (203) diffuser/mass transfer device body, the (207) spacer and the (219) retainer.

FIG. 9 is an end view of the (203) diffuser/mass transfer body that contains the water under pressure and the air under pressure before and after contact is made between the liquid phase water and the gas phase air. The (221) opening in the (203) diffuser/mass transfer body for the passage of the compressed air into the (205)

gas inlet ring is shown. The (219) anti-rotation locking bar holds the (207) injection spacer rings in each stage, the (215) discharge directional ring and the (219) diffuser/mass transfer reversible baffles in the position required.

Figure 10:
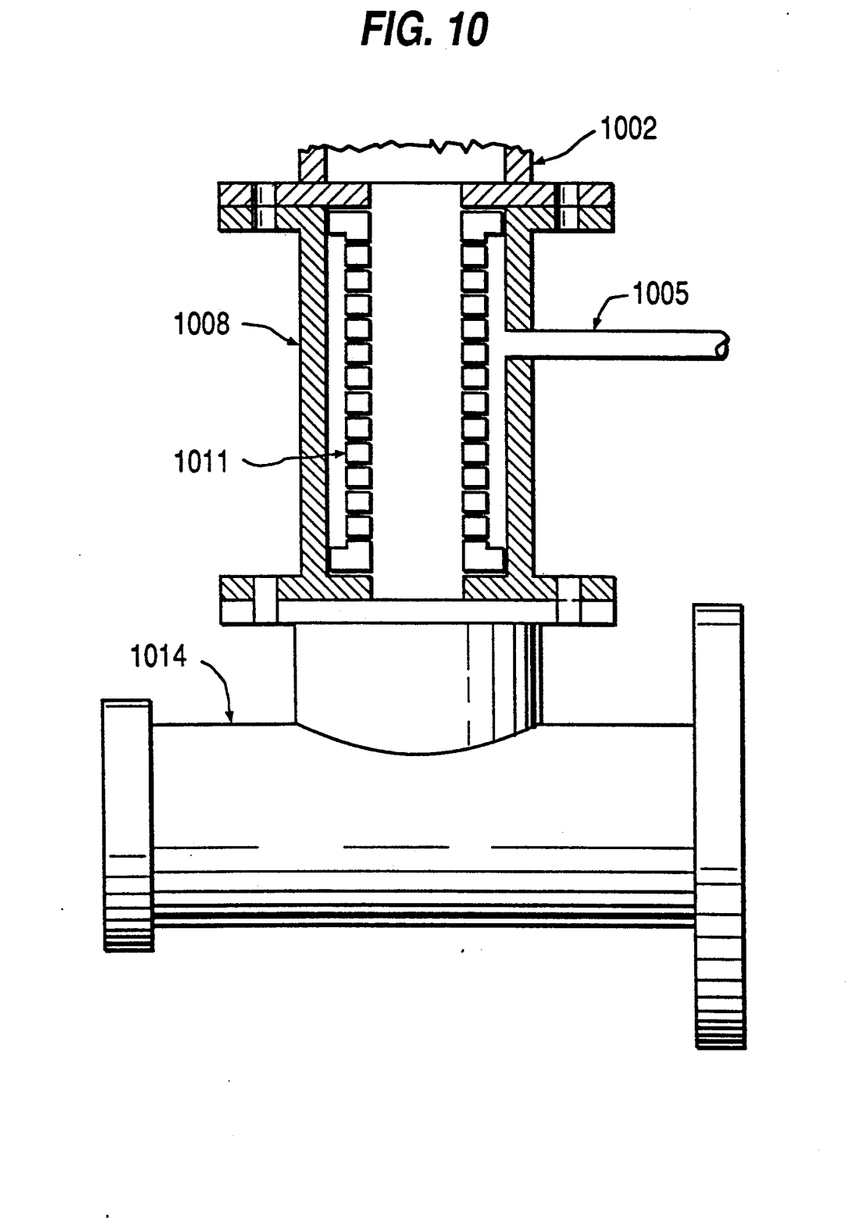
FIG. 10 is a sectional view of a strainer of known design used to protect the (217) valves from plugging.

FIG. 10 is a sectional view of a type of strainer that optionally could be used to protect the (217) injection control valve from large size solids. This type of strainer is of the self cleaning type using a recycle flush of the interior surface of the strainer element to the pump suction by the use of a differential pressure control of a valve. The items shown in the drawing include the (1014) tee type pipeline mounting, the (1005) pipeline providing water to the (217) valves, the (1002) pipeline returning to the pump suction, the (1008) strainer housing and the (1011) strainer body.

The diffuser/mass transfer device is fed with water under pressure. Preferably, the water under pressure is obtained from a centrifugal pump, use of centrifugal pumps being a high efficiency way of circulating liquids. After the water enters the diffuser/mass transfer device through the (201) inlet spool it is impacted with a circular 90 degree injection of compressed air or oxygen supplied through the (221) opening and then the (205) gas inlet ring. The water and air or oxygen then pass through the sections including a series of spacers (207) and knife edged diffuser baffles (209). By the use of one or a series of spaced knife edge diffuser baffles (209), the back pressure within the diffuser/mass transfer device can be adjusted to obtain the ideal pressure drop in relation to the minimum height of the wastewater in the oxygen control zone.

While the diffuser/mass transfer device has been described particularly for use in connection with dissolving oxygen is wastewater, it is, of course, useful for dissolving gases, in general, in liquids, in general.

Figure 11:
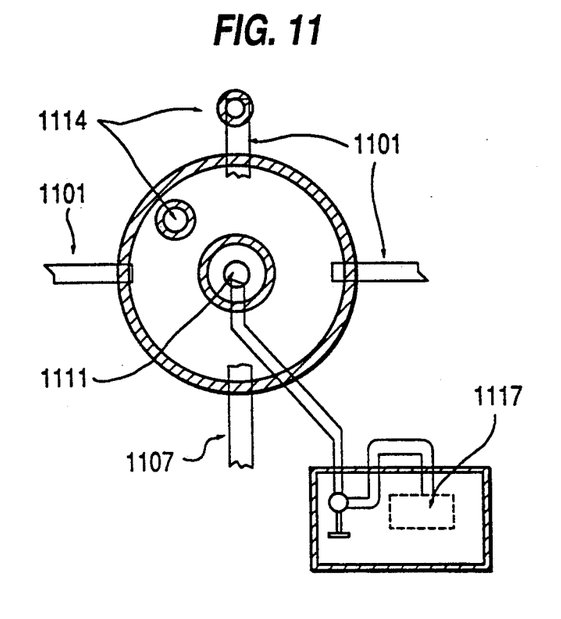
FIG. 11 is a plan view of a gravity intersecter design for retention of wastewater and the installation of a submersible pump with diffuser/mass transfer device.
Figure 12:
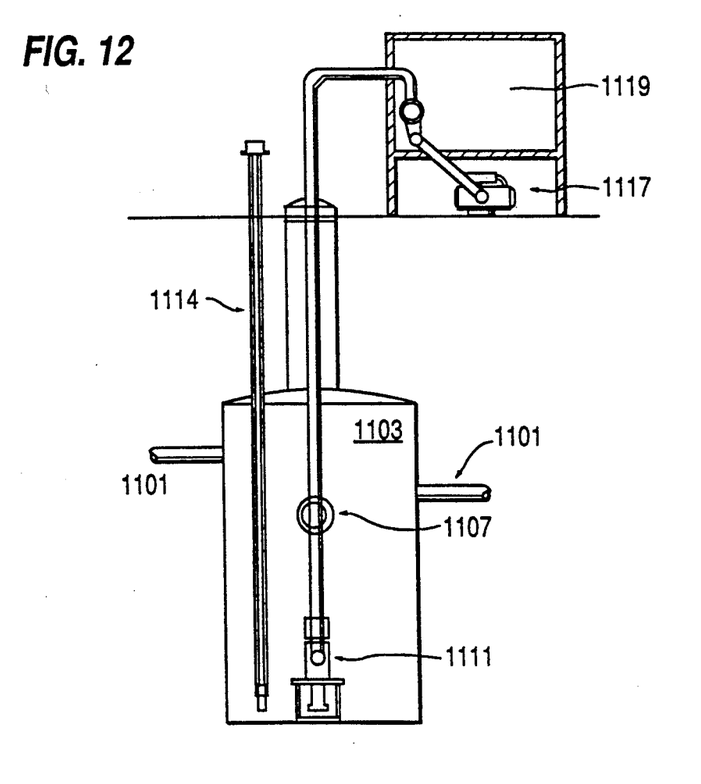
FIG. 12 is an elevation view of the gravity intersecter shown in plan view in FIG. 11.

FIGS. 11 and 12 are plan and elevational views, respectively of the retention type gravity intersecter to be used in the gravity pipeline collection system not only at points of junction of two or more gravity pipelines but also at any point in the gravity collection system that requires increases in the dissolved oxygen level in order to maintain positive values.

The gravity intersecter includes the (1101) gravity inlet pipelines, the manhole entrance to the (1103) dissolved oxygen control retention area, the (1111) submersible pump with diffuser/mass transfer device, the (1114) dissolved oxygen probe, the (1117) air compressor, and the (1119) control panel.

The below ground location of the dissolved oxygen control zone which must be established on the basis of peak flow rates and minimum retention time for oxygen transfer. The drawings define the above location of the manhole for the installation of the (1111) submersible pump with a diffuser/mass transfer device. The submersible pump could be of either the free standing type or of the rail mounted type. The supply of compressed air from the (1117) air compressor uses tubing between the compressed air storage tank and the inlet of the diffuser/mass transfer device. The flow control of the air by components of the control panel include a very low flow needle valve to maintain pressure on the air passages of the diffuser/mass transfer device and an electrically operated control valve for any added requirements based on depletion of the dissolved oxygen level. This valve would be operated by the (1114) dissolved oxygen probe. The electric breakers, motor starters and the power supply for the dissolved oxygen control valve would be located within the panel. The (1117) air compressor and air storage located outside the panel thus providing cooling to the air compressor motor. The (1107) gravity outlet pipeline is located based on the desired retention.

Figure 13:
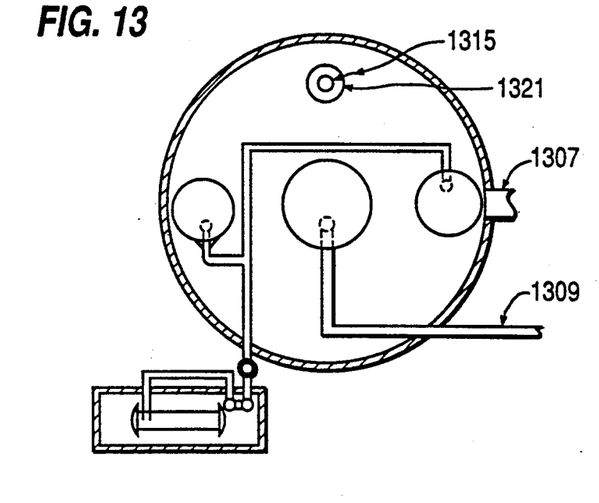
FIG. 13 is a plan view of a primary pump station designed for submersible transfer pumps and submersible pumps with diffuser/mass transfer device.
Figure 14:
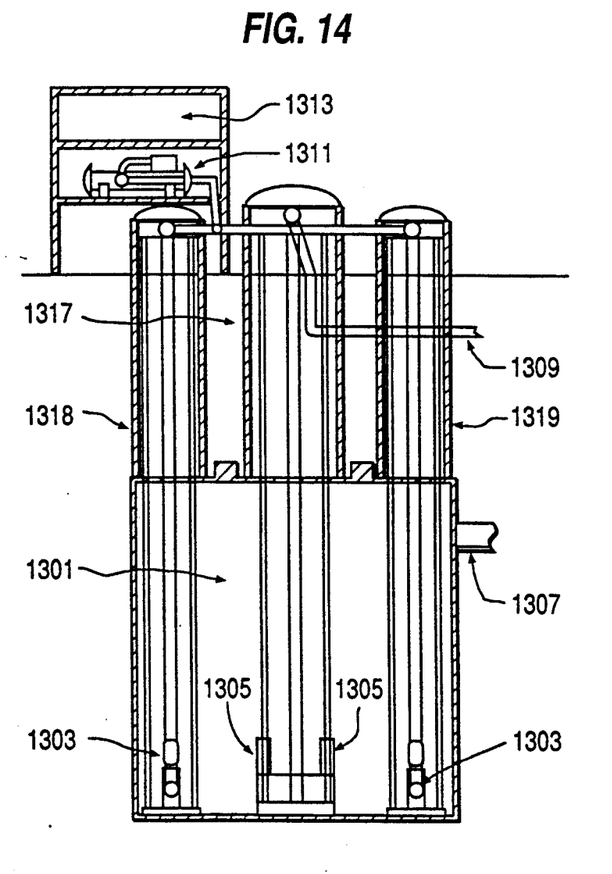
FIG. 14 is an elevation view of the primary pump station shown in plan view in FIG. 13.

FIGS. 13 and 14 are plan and elevational views, respectively of the primary pump station that receives the gravity flow from the gravity collection pipeline system. The dissolved oxygen control zone of the pump station is located below ground level in order to receive the wastewater flow by gravity from the gravity collection pipeline system. The selection of the size of the dissolved oxygen control zone is based on two factors. The first factor is the time required for the transfer of the oxygen from the gas phase into the dissolved liquid stage and the time required for the bacterial uptake of the dissolved oxygen. The second factor is the degree of peak flow experienced in the gravity pipeline collection system which would effect the retention time. The drawing shows the (1301) dissolved oxygen control area, the (1303) rail mounted submersible pump with diffuser/mass transfer device with flexible tubing compressed air supply, the (1305) rail mounted constant rate submersible transfer pumps, the (1307) gravity incoming pipeline of the gravity collection system serviced by the pump station, the (1309) pressurized pipeline that transports the wastewater to either a re-pump station or directly to the wastewater treatment plant, the (1311) air compressor with storage tank, the (1313) electrical control panel containing breakers, motor starters and the control and air flow electric operated control valve for the dissolved oxygen probe. The (1315) dissolved oxygen probe is a commercially available unit that provides a signal that conforms to the concentration of the dissolved oxygen in the (1301) dissolved oxygen control zone, the (1317) is a removal tube for the rail mounted submersible constant rate transmission pumps, the (1319) are removal tubes for the rail mounted submersible pumps equipped with diffuser/mass transfer devices and (1321) is the removal tube for the dissolved oxygen probe.

The (1313) electric control panel is above ground level with flexible tubing connecting the compressed air supply to the inlet of the diffuser/mass transfer devises of (1303). The removal tube hatches for the (1303) submersible pumps with diffuser/mass transfer devices, the (1505) constant rate submersible transmission pumps and the (1315) dissolved oxygen probe are all above ground level. The balance of all components are below ground.

Figure 15:
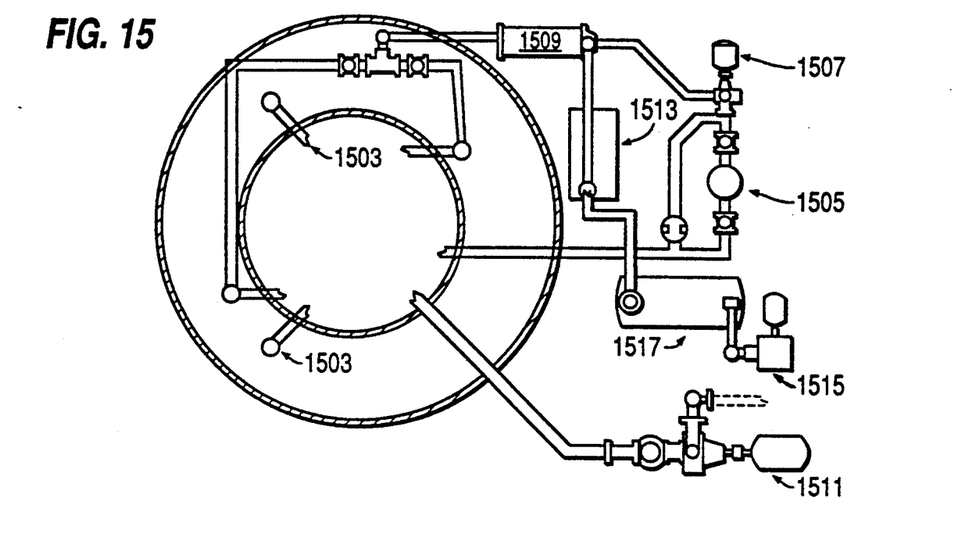
FIG. 15 is a plan view of a re-pump station designed for above ground installation, providing storage time for control of dissolved oxygen.
Figure 16:
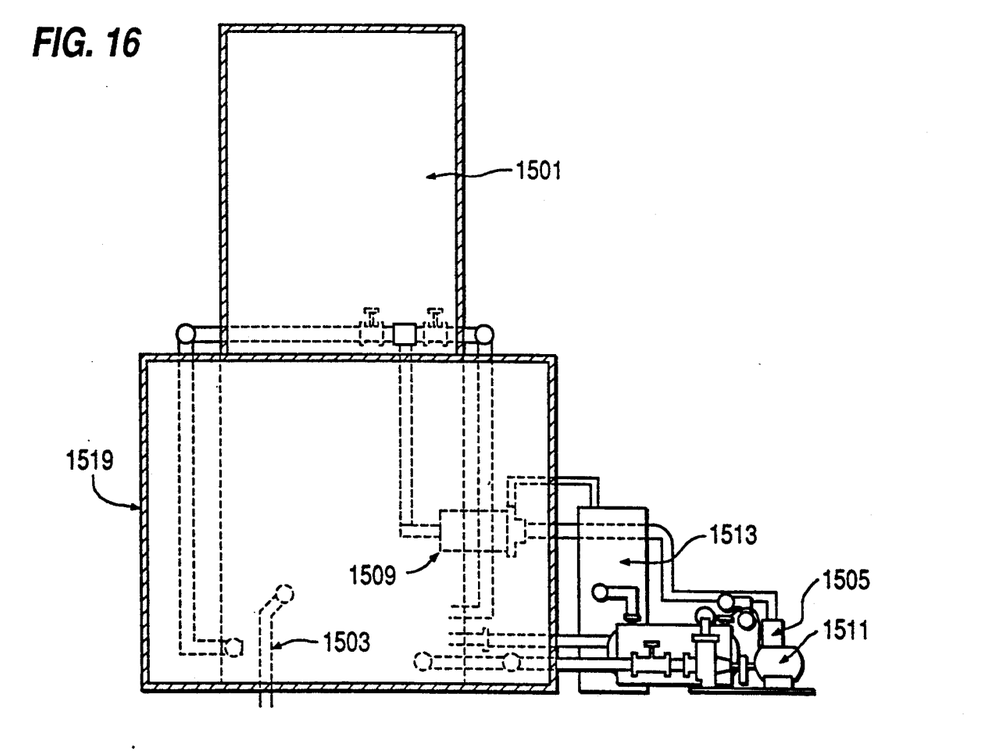
FIG. 16 is an elevation view of the re-pump station.

FIGS. 15 and 16 are plan and elevational views, respectively of a re-pump station design in which all components are located above ground in order to eliminate the problem of flooding caused by excess rainfall. In a great number of cases, below ground pump station flooding has resulted in the uncontrolled discharge of raw (untreated) wastewater into watercourses and in turn great damage to the environment. By the use of above ground level wetwells for re-pump stations and the use of submersible pumps on all primary pump stations, the effect of uncontrolled storm water run-off can be eliminated. The use of a small diameter high pump station wetwell not only provides for minimum requirements for land for pump station construction, but also provides very high efficiency of the transfer of gas phase oxygen into dissolved oxygen. This is due to the liquid height of the wastewater in the wetwell, which increases the concentration possible of dissolved oxygen. As the pressurized wastewater travels from the bottom of the wetwell (oxygen control zone) due to the increased amount of dissolved oxygen which in turn effects the specific gravity of the water and causes it to rise, the super-saturated dissolved oxygen is released in the form of microbubbles which have very large surface areas and thus are effective in the resupply of the dissolved oxygen used in bacterial growth. The drawings show the (1501) dissolved oxygen control zone, the (1503) pressurized pipeline providing transmission of the wastewater from the primary stations, the (1505) dissolved oxygen probe located in the suction piping of the (1507) centrifugal recirculation pump, the (1509) diffuser/mass transfer device with piping for the supply of compressed air from the (1513) control panel. Based on a design capacity of the (1501) dissolved oxygen control zone of 3 to 5 hours of average daily flow, with consideration of the peak flow developed in each gravity collection system, the re-pump station can use (1511) constant speed transmission pump for the transfer of the wastewater to the treatment plant. This results in high electrical efficiency, low maintenance costs and most importantly a high degree of reliability. As the volume of compressed air is very low when compared to current oxygen transfer systems. The (1515) air compressor can be very small if a (1517) high pressure compressed air storage tank is used. As the contents of the dissolved oxygen control zone are always maintained at a positive dissolved oxygen level, toxic chemicals cannot be generated and there is no open discharge of toxic materials into the environment as only water and carbon dioxide are produced as a result of bacterial action. The drawing shows the use of the (1519) emergency containment structure that would serve as a barrier if for any reason a failure should occur in the structure of the (1501) dissolved oxygen control zone.

FIG. 16 shows that the station is above ground level and the relative height of (1501) the pump station wetwell which is also used for the dissolved oxygen control zone and the (1519) emergency containment structure. The diameter of (1501) can be determined by the peak flow conditions of the primary PUMP stations. In order to obtain high efficiency oxygen transfer the design of the storage type wetwell (dissolved oxygen control area) should not be less than 20 feet. In most wastewater transmission systems, heights of 40 to 50 feet could be considered usable from the standpoint of the return of pump energy required in the primary pump station to be injected into the liquid column formed by the height of the wetwell. only re-pump in close proximity to the treatment plant would be limited in design height by the loss of return of pump energy due to low head requirements of the transfer pumps.

The design of the (1519) emergency containment structure should be of adequate volume to hold the maximum volume of wastewater in the (1501) wetwell (dissolved oxygen control zone). The function of the (1519) emergency containment structure, in addition to providing protection against failure of the structure of the (1501) wetwell could be the protection of re-pump stations against surface water. Many pump station locations in low lying areas are subject to flooding and, with the use of constant speed submersible motors to drive the transfer pumps, this design will provide complete protection against both of the present pump station surface flooding problems and overflow from the wetwell of conventional station wetwell resulting in pump drive failure due to flooding of the pump motor or pump control panel.

Figure 17:
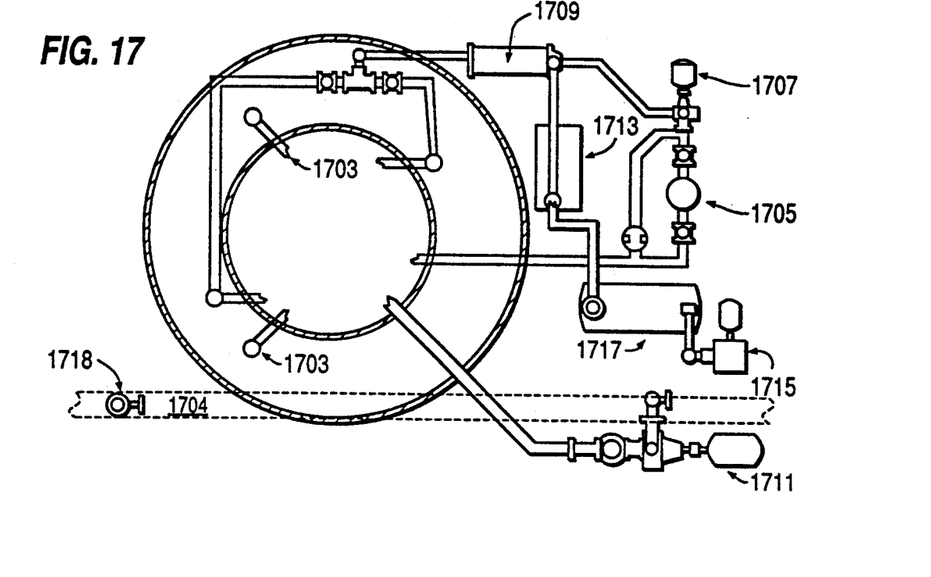
FIG. 17 is a plan view of a master re-pump station that is designed for above ground installation with the same details of FIG. 15 with the exception of a variable speed pump drive.
Figure 18:
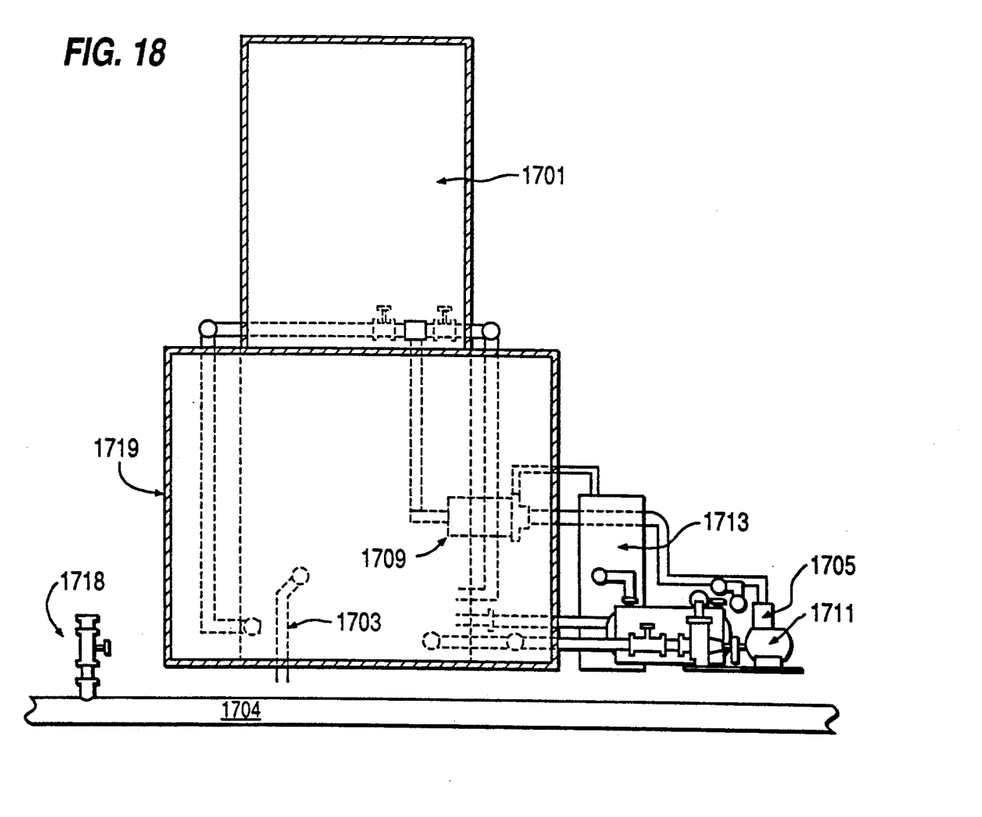
FIG. 18 is an elevation view of the master re-pump station shown in FIG. 17.

FIGS. 17 and 18 are plan and elevational views, respectively, of is a plan view of a master re-pump station which would use the same design basis as the FIG. 15 and FIG. 16 re-pump stations, with the exception of the pump constant speed pumps being replaced with variable speed drives. Only a single installation in a large collection and transmission system, would be required and then only if the peaking factor could not be satisfied by sizing of the wetwell (dissolved oxygen control zone) of the many primary and re-pump stations in the system.

The items identified in the drawing are (1701) the dissolved oxygen control zone, (1703) the primary pump station transmission pipelines, (1705) the dissolved oxygen probe, (1707) the centrifugal recirculation pump, (1709) the diffuser/mass transfer device, (1704) pipeline to treatment Plant, (1711) variable speed transmission pump, (1713) the control panel, (1715) the air compressor, (1717) the air storage tank, (1718) pressure transducer for variable speed, and (1719) the emergency containment structure.

Figure 19:
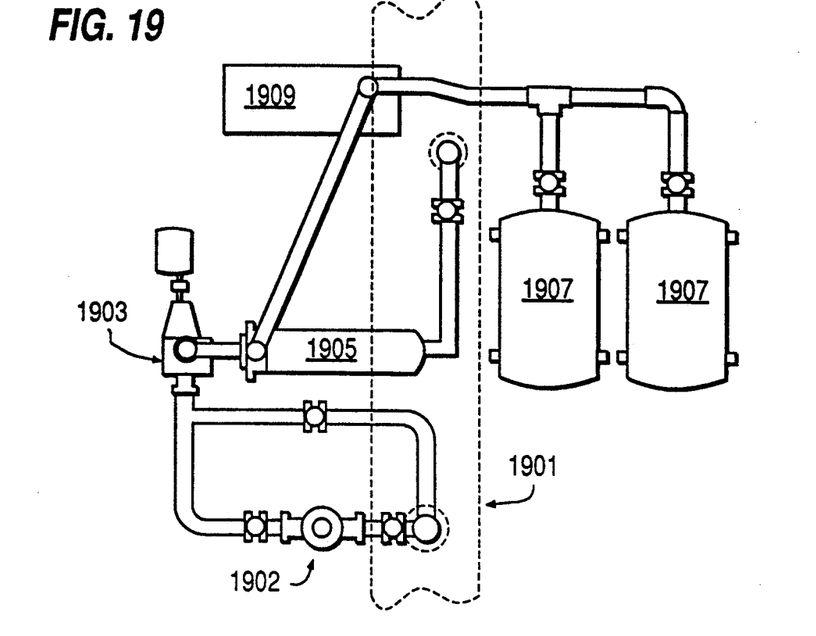
FIG. 19 is a plan view of a pipeline dissolved oxygen control pump station designed for use with pure oxygen.
Figure 20:
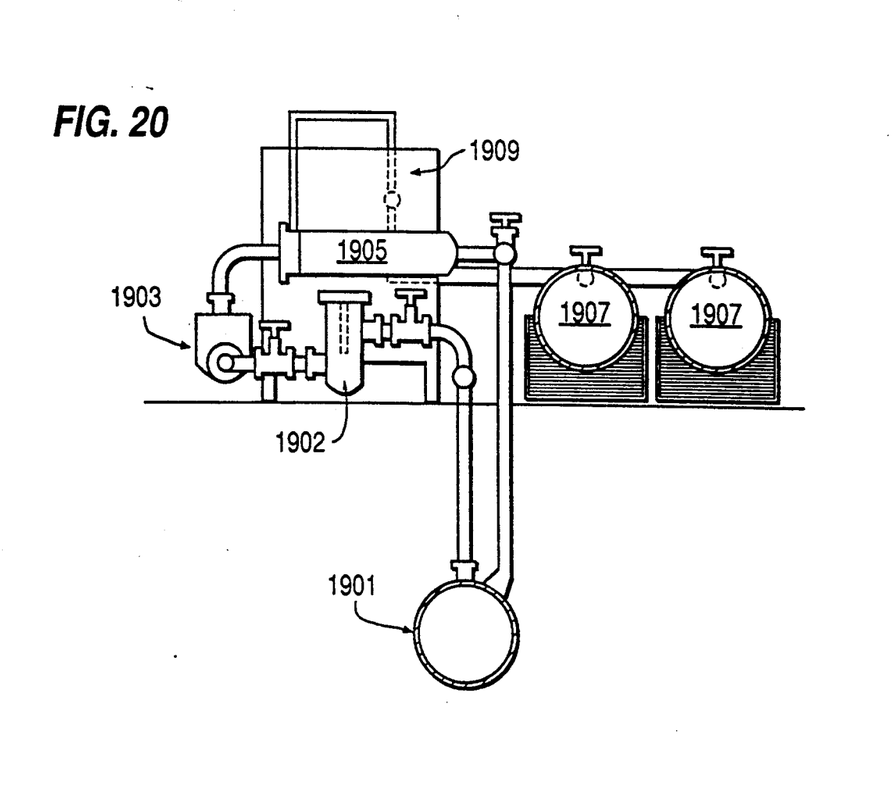
FIG. 20 is an elevation view of the pipeline dissolved oxygen control pump station shown in plan view in FIG. 19.

FIGS. 19 and 20 are plan and elevational views, respectively, is a plan view of the pipeline dissolved oxygen control pump station which is intended to be installed in any pressurized wastewater pipeline in any location in which the wastewater low flow rates have caused the wastewater to be depleted in dissolved oxygen concentration by bacterial action. During warm weather, wastewater temperatures can be elevated to a point at which dissolved oxygen levels of as low as 2 pounds of oxygen in one million pounds of water are the maximum limit of solubility. In this case, the loss of dissolved oxygen by bacterial action can occur in a short amount of retention time. The need for the replacement of this dissolved oxygen, to inhibit the generation of toxic chemical caused by bacterial action, in a pressurized pipeline system can only be obtained by the use of pure industrial grade oxygen. Introduction of even oxygen can result in a pipeline rupture if the amount is not carefully controlled and is limited to the amount of pure oxygen that can be dissolved in the volume of water passing through the pipeline. The introduction of air even in a small controlled amount would be dangerous due to the Nitrogen present which would not be used by bacteria. The presence of a gas in a wastewater pipeline can result in rupture of the pipeline and the resulting environmental damage. The items defined in the drawings are the (1901) pressurized pipeline to the treatment plant, (1902) the dissolved oxygen probe, (1903) the centrifugal recirculation pump, (1905) the diffuser/mass transfer device, (1907) industrial grade pure oxygen storage tanks and (1909) the control panel.

The operation of the pipeline oxygen control pump station is based on the continuous operation of the centrifugal recirculation pump which in turn, provides a sample of the dissolved oxygen in the wastewater in the pipeline by the (1902) dissolved oxygen probe. If the dissolved oxygen level is low, a control valve in the control panel (1909) opens to allow the flow of oxygen from the (1907) pure Oxygen storage tank to be directed to the diffuser/mass transfer device. As long as the wastewater in the transmission pipeline is low in dissolved oxygen level, the oxygen feed valve remains open.

The dissolved oxygen pipeline pump station would be located above ground level in an area that would be accessible to the delivery of supplies of either compressed or liquefied oxygen. The suction pipeline of the (1903) centrifugal recirculation pump is shown taking the pressurized flow of wastewater from the (1901) pipeline and after adding oxygen, as needed, by the means of the (1905) diffuser/mass transfer device, returns the wastewater to the (1901) pressurized pipeline. The re-injected wastewater, with a high level of dissolved oxygen, is mixed in the main flow in the pressurized pipeline with the main stream flow of the wastewater thus raising the level of dissolved oxygen in the complete flow of wastewater in the pipeline. This method is commonly referred to as a "side arm circulation system".

The location of the pipeline dissolved oxygen control pump station in the pipeline systems is determined by the chemical oxygen demand, the bacterial oxygen demand, the peak flow demand of the system, the initial level of dissolved oxygen in the water, the rate and duration of the nighttime flow and the total retention time in the gravity collection and pressurized transmission system. This method converts the system into a treatment system.

I claim:

1. An apparatus for providing a preselected concentration of a dissolved gas in a liquid, comprising:
    a diffuser body through which said liquid flows, said diffuser body having an inlet and an outlet;
    means for injecting said gas under pressure into said diffuser body near said inlet thereof;
    a predetermined number of baffles provided in said diffuser body between said inlet and said outlet for causing turbulence in the flow of liquid through said diffuser body and causing a decrease in pressure from said inlet to said outlet; and
    a pump for delivering said liquid at a preselected pressure to said inlet of said diffuser body, said number of baffles and the preselected pressure at which said pump delivers said liquid to said inlet providing said preselected concentration of dissolved gas in said liquid.

2. An apparatus according to claim 1, wherein said gas is oxygen and said means for injecting said gas under pressure includes a source of compressed air or oxygen.

3. An apparatus according to claim 1, wherein said liquid is wastewater and said means for delivering said liquid is a pump.

4. An apparatus according to claim 1, wherein said meas for delivering said liquid is a centrifugal pump.

5. An apparatus according to claim 1, wherein said means for injecting said gas includes a gas under pressure inlet ring provided adjacent said inlet of said diffuser body and through which said liquid flows, said gas inlet ring having gas passages arranged so as to deliver said gas to said liquid at a 90° angle to the flow of liquid.

6. An apparatus according to claim 1, wherein said at least one baffle includes a plurality of parallel knife edge blades arranged at an angle to the flow of liquid therethrough.

7. An apparatus according to claim 1, comprising a plurality of said baffles spaced apart within said diffuser body.

8. A method for providing a preselected concentration of a dissolved gas in a liquid, comprising;
    delivering liquid at a preselected pressure to an inlet of a diffuser body;
    introducing gas into said liquid near said inlet of said diffuser body;
    flowing said liquid across a preselected number of baffles within said diffuser body to cause turbulence in the flow of liquid and to cause a decrease in pressure from said inlet toward an outlet of said diffuser body, said number of baffles and the preselected pressure at which said pump delivers said liquid to said inlet providing said preselected concentration of dissolved gas in said liquid.

9. A wastewater collection, transmission and treatment system comprising the following components:
    a source of wastewater;
    a gravity intersecter;
    a pump station;
    pipelines connecting said source of wastewater to said gravity intersecter and connecting said gravity intersecter to said pump station;
    a wastewater treatment plant; and
    a pressurized wastewater pipeline connecting said pump station to said wastewater treatment plant;
    wherein at least one of said gravity intersecter, said pump station, said wastewater treatment plant and said pressurized wastewater pipeline includes a diffuser/mass transfer device for providing a preselected concentration of a dissolved oxygen in wastewater, comprising:
    a diffuser body through which said wastewater flows, said diffuser body having an inlet and an outlet;
    means for introducing said oxygen into said diffuser body near said inlet thereof;
    a predetermined number of baffles provided in said diffuser body between said inlet and said outlet for causing turbulence in the flow of wastewater through said diffuser body and causing a decrease in pressure from said inlet to said outlet; and
    a pump for delivering said wastewater at a preselected pressure to said inlet of said diffuser body, said number of baffles and the preselected pressure at which said pump delivers said liquid to said inlet providing said preselected concentration of dissolved oxygen in said liquid.

10. A system according to claim 9, wherein said pump station is a primary pump station and said system further comprises a re-pump station between said primary pump station and said wastewater treatment plant, said re-pump station including said diffuser/mass transfer device.

11. A system according to claim 10, wherein said re-pump station is located above ground.

* * * * *